(12) United States Patent
Onodi

(10) Patent No.: US 8,723,044 B2
(45) Date of Patent: May 13, 2014

(54) FLAT CABLE DEFLECTION DEVICE AND INSTALLATION KIT FOR AN ELECTRICAL INSTALLATION WITH CIRCUIT INTEGRITY IN CASE OF FIRE

(75) Inventor: Tamas Onodi, Thalwil (CH)

(73) Assignee: Woertz AG, Muttenz (CH)

( * ) Notice: Subject to any disclaimer, the term of this patent is extended or adjusted under 35 U.S.C. 154(b) by 257 days.

(21) Appl. No.: 13/082,716

(22) Filed: Apr. 8, 2011

(65) Prior Publication Data

US 2011/0247875 A1    Oct. 13, 2011

(30) Foreign Application Priority Data

Apr. 10, 2010 (DE) .......................... 10 2010 014 530

(51) Int. Cl.
*H01B 7/06*    (2006.01)
(52) U.S. Cl.
USPC ..... 174/117 F; 174/135; 174/72 A; 174/73.1; 174/69; 174/68.1; 361/825; 361/826
(58) Field of Classification Search
USPC .................. 252/157.1, 615.21; 361/825, 826
See application file for complete search history.

(56) References Cited

U.S. PATENT DOCUMENTS

| | | | | |
|---|---|---|---|---|
| 2,458,573 | A | * | 1/1949 | Donahue ....................... 254/395 |
| 2,855,163 | A | * | 10/1958 | Powers ....................... 242/157.1 |
| 3,077,337 | A | * | 2/1963 | Cronkright .......... 254/134.3 PA |
| 3,257,500 | A | | 6/1966 | Rusch, Jr. et al. |
| 3,327,077 | A | | 6/1967 | Morris |
| 3,425,865 | A | | 2/1969 | Shelton, Jr. |
| 4,103,984 | A | | 8/1978 | Mixon, Jr. |
| 4,202,457 | A | * | 5/1980 | Tansi ............................. 220/3.3 |
| 4,406,916 | A | | 9/1983 | Southerland |
| 5,296,648 | A | | 3/1994 | Johnson |
| 6,027,367 | A | | 2/2000 | Woertz et al. |
| 2005/0274842 | A1 | * | 12/2005 | Rubenstein ................ 242/615.3 |
| 2009/0078446 | A1 | | 3/2009 | Pons et al. |
| 2009/0133897 | A1 | | 5/2009 | Jorand et al. |

FOREIGN PATENT DOCUMENTS

| | | |
|---|---|---|
| CA | 962 350 | 2/1975 |
| CH | 696 791 | 12/2003 |
| CH | 696 791 | 11/2007 |

(Continued)

OTHER PUBLICATIONS

Englsih translation of JP 1994-314520.*

(Continued)

*Primary Examiner* — Tuan T Dinh
*Assistant Examiner* — Steven T Sawyer
(74) *Attorney, Agent, or Firm* — Frost Brown Todd LLC

(57) ABSTRACT

A flat cable deflection device with circuit integrity in case of a fire including a cylindrical cable deflection element made from fire resistant insulating material; and a support for the cylindrical cable deflection element made from fire resistant material. The support is offset from the cylindrical cable deflection element so that the support facilitates enveloping the cylindrical cable deflection element with a flat cable without the support contacting the flat cable. An electrical installation including at least one flat cable deflection device; at least one flat cable including plural high power current strands extending parallel adjacent to one another in a plane, where the flat cable runs over the deflection device and changes its direction at the deflection device, wherein the transversal cable direction in front and after the deflection device extends horizontally, and wherein the flat cable envelops the cylindrical cable deflection element at least partially.

14 Claims, 8 Drawing Sheets

(56) References Cited

FOREIGN PATENT DOCUMENTS

| | | |
|---|---|---|
| DE | 1 133 779 | 7/1962 |
| DE | 2 206 187 | 8/1972 |
| DE | 25 07 130 | 4/1976 |
| DE | 200 01 604 | 7/2001 |
| EP | 0 665 608 | 8/1995 |
| EP | 1 648 052 | 4/2006 |
| EP | 2 375 505 | 10/2011 |
| EP | 2 385 532 | 11/2011 |
| GB | 2 419 240 | 4/2006 |
| JP | 01-117204 | 5/1989 |
| WO | WO 97/48108 | 12/1997 |
| WO | WO 00/31834 | 6/2000 |
| WO | WO 01/22534 | 3/2001 |
| WO | WO 01/022534 | 3/2001 |

OTHER PUBLICATIONS

Abstract for EP 0 665 608.
Copy of GB 1 385 357 which was also filed as DE 2 206 187.
European Search Report dated Aug. 6, 2013 for Application No. 11002251.4.
English Machine Translation of European Application No. EP 2 375 505.
English Machine Translation of European Application No. EP 2 385 532.

\* cited by examiner

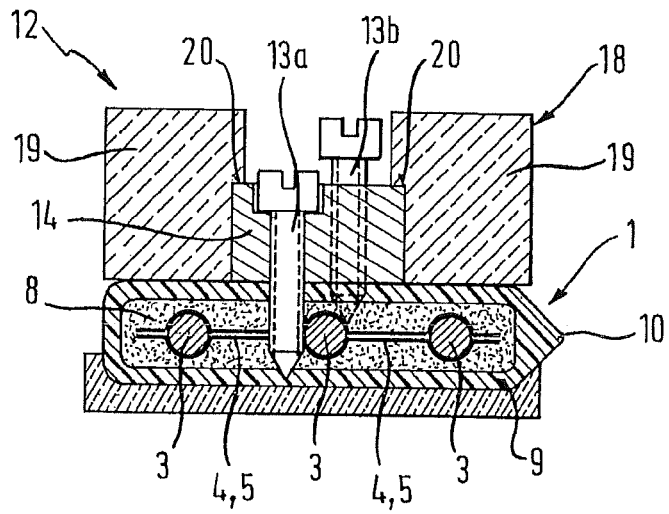
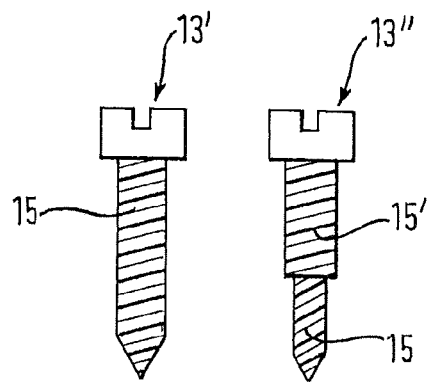
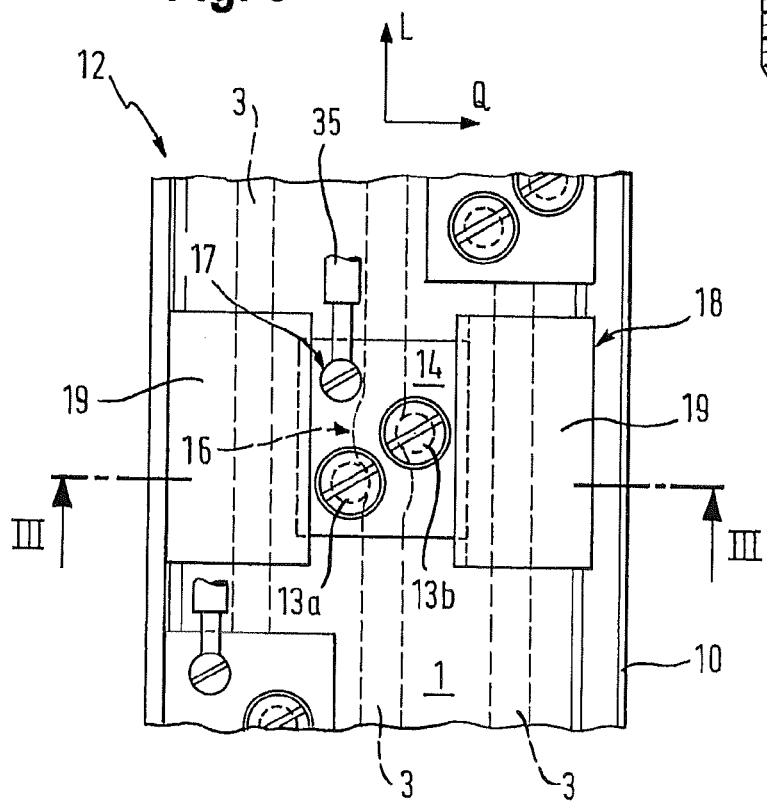

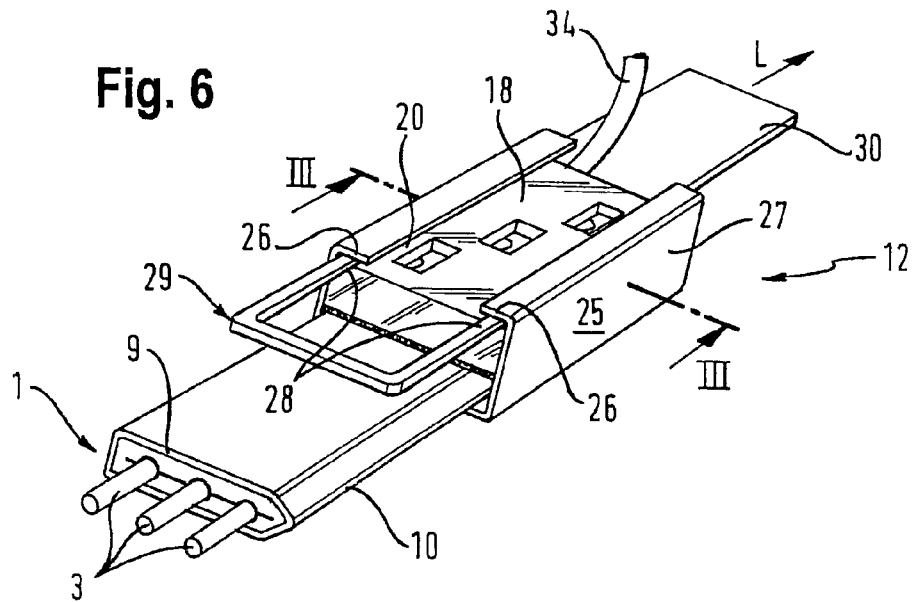
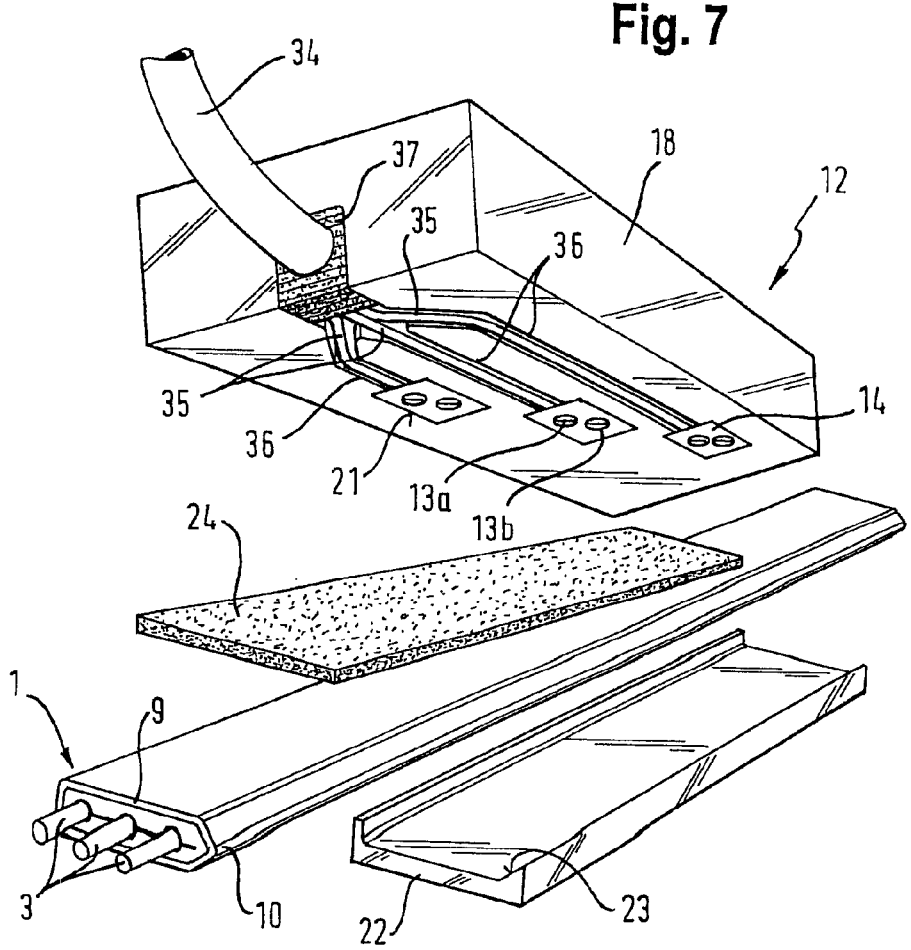

FLAT CABLE DEFLECTION DEVICE AND INSTALLATION KIT FOR AN ELECTRICAL INSTALLATION WITH CIRCUIT INTEGRITY IN CASE OF FIRE

FIELD OF THE INVENTION

The invention relates to a flat cable deflection device and installation kit for an electrical installation with circuit integrity in case of fire.

BACKGROUND OF THE INVENTION

In larger buildings, traffic structures like e.g. tunnels and ships evacuation times can be 30 minutes or more. Therefore these structures are typically equipped with electrical emergency devices which have to be supplied with electrical energy at least during the evacuation time period in order to facilitate an evacuation. These are e.g. smoke extraction blowers, emergency lighting and placards, etc.

The suitability of an electrical installation for power supply also under the effect of a fire is designated as circuit integrity. Circuit integrity is defined by different standards. E.g. cables are being loaded with a voltage according to the standard IEC 60331-11/-21/-23/-25 and exposed to a temperature greater than 750° C. for 90 to 180 minutes under the effect of a flame. After some time the strand insulations of the cable lose their insulation capability under the flame effect and the strands of the cable short out. This means a functional breakdown. The behavior under this test is designated through "FE" with information regarding the duration of circuit integrity in minutes. A cable that maintains circuit integrity under this test e.g. for 90 minutes is designated as "FE 90". Similar standards are BS 6387 cat. C and VDE 0472-814. Other standards relate to circuit integrity of cables under the impact of fire and water which e.g. is intended to represent the effect of sprinkler systems in case of a fire, thus e.g. DS 6387 cat. W and VdS 3423. Other standards relate to circuit integrity of cables under the effect of fire and mechanical impacts which is e.g. intended to simulate the effect of components falling onto the cable as it often occurs during a fire, thus EN 50200, EN 50362, and ES 6387 cat. Z. Besides that there are standards which relate to circuit integrity not only of cables but of entire installation systems. This is also designated as system circuit integrity. System circuit integrity, besides the cable, includes supporting elements like cable fasteners, cable suspensions and cable guides and electrical connection elements like branch off- and connection devices since they all together assure circuit integrity of an entire installation. A standard relating to system circuit integrity is e.g. DIN 4102 part 12. For a test according to this standard, flame application and heat up of an entire installation is performed over a length of 3 m according to a particular rising standard temperature curve which initially has a steep slope and then becomes flatter and flatter until it reaches approximately 900° C. after 90 minutes. The behavior under this test is represented by "E" with a statement for the duration of the circuit integrity in minutes. Thus, "E 90" represents system circuit integrity for 90 minutes.

Typical cables do not comply with circuit integrity requirements of this type since the strand insulation can melt off or burn off rather quickly under fire influence and a short circuit can then occur through conductors contacting one another. In order to prevent a short circuit particular devices like particular strand insulations are required. Generally obtaining higher circuit integrity durations is technically complex. The same applies with respect to the relatively high requirements which are placed by the system circuit integrity standards upon support elements and connection elements.

SUMMARY OF THE INVENTION

The present invention relates to a flat cable deflection device with circuit integrity in case of a fire. It relates to a cylindrical cable deflection element made from fire resistant insulating material and a support for the cylindrical deflection element made from fire resistant material wherein the support is offset from the cylindrical deflection element so that it facilitates that the cylindrical deflection element is enveloped by the flat cable without touching the support.

Another independent feature of the invention relates to an implemented electrical installation which includes at least one flat cable deflection device as recited supra and at least one flat cable with plural high-current strands extending in a plane parallel next to one another. The flat cable runs over the deflection device and changes its direction at the deflection device, wherein the transversal cable direction is horizontal in front and after the deflection device and wherein the flat cable at least partially envelops the cylindrical cable deflection element.

Another independent feature of the invention relates to an installation kit for an electrical installation with circuit integrity in case of a fire including at least one flat cable deflection device as recited supra and a flat cable with plural high-current strands extending parallel adjacent to one another in a plane.

Another independent feature eventually relates to a flat cable guide with circuit continuity under fire impact, wherein the flat cable guide includes at least one support for a flat cable and a receiver made from fire resistant insulating material like glass or ceramics. The receiver is arranged on the support and configured so that the flat cable is insertable into the receiver.

General Description of Embodiments

Flat cables are not only being used as data cables but they are also being used for high-power current conductors to be installed in buildings. A high-power current flat cable of this type and its associated connection device for tapping into a flat cable without stripping an insulation are known e.g. from DE 2 206 187. High-power current in the present description is a current with a voltage of at least 100 V (e.g. in North America 120V/60 Hz and 230V/50 Hz in most other countries (voltages refer to one respective phase against ground) for supplying electrical consumers with energy. A high power current strand is insulated from the other high power strands of a cable against voltages and typically configured for currents of at least 6 A. Also hybrid flat cables with high power current strands and data transmission strands are known (e.g. from EP 0 665 608 A2). Hybrid flat cables in view of their high power current component also have to be considered as flat cables with high power current strands.

The inventors of the instant invention have found that a flat cable is in principle configured in particular for circuit integrity. In typical round cables the strands are twisted with one another. Therefore in case of a fire the strand conductors lie on top of one another at the intersection points after the strand insulation has burned off. For flat cables, however, strand conductors extend without intersection points in the cable. Therefore, a flat cable has better properties with respect to the risk of shorting out. Furthermore a flat cable practically has no inner tensions like they are typical e.g. for twisted round cables and thus has no pronounced tendency as the round cable to warp when the insulation burns off.

Based on this finding of better general suitability of a flat cable for circuit integrity the present invention relates to providing a device which facilitates running a flat cable around a corner so that circuit integrity is maintained in case of a fire, thus that a short circuit of the high power current strands of the flat cable e.g. through contacting strands is avoided. The device is designated as flat cable deflection device.

For a conventional building installation with flat cables the corner support for the flat cables is generally performed in a manner that is rather unfavorable for circuit integrity. Thus, a horizontally extending flat cable is generally arranged vertically in front of a vertical corner and the cable is then just bent by 90° in the corner. This technique, however, has the disadvantage that the high power current strands of the flat cable are placed on top of one another by putting the flat cable vertical and therefore there is a risk that the strands that are disposed vertically on top of one another collapse when the cable insulation burned off so that they contact one another, thus generating a short circuit. The inherent advantage of the flat cable with respect to maintaining the function based on the strands being arranged adjacent to one another without crossover is not being used with the conventional technique of edge support. Thus, it would rather be desirable to place the flat cable horizontal in front and after the corner and to avoid any mechanical tension on the high power current strands in the portion of the corner bend, wherein the mechanical tension could lead to the high power current strands touching one another after the cable insulation has burned off. The inventors have found that the problem is solved through a cylindrical cable deflection element which is at least partially enveloped by the flat cable. This facilitates providing a direction change to a flat cable that extends horizontally in front and after the deflection device, wherein the flat cable is only bent, but no additional mechanical tensions are applied to the flat cable which could bring the strands of the flat cable into contact when the cable insulation burns off. This feature of a cylindrical envelopment is eventually based on a property of a cylindrical enveloping surface known from differential geometry in that the cylindrical enveloping surface namely has no internal curvature. A triangle drawn on a cylindrical enveloping surface namely has an angle sum of 180° exactly like in the plane, but differently from a triangle drawn onto a sphere or a saddle which have angle sums that are greater or smaller than 180°. Based on this lack of inner curvature a bendable, but not expandable strip can be wound about a cylinder, thus not only perpendicular to the cylinder axis, but also at a slant angle to the cylinder axis.

Based on these findings it only has to be provided for the deflection device that the deflection device itself is fire resistant, the cable deflection element is non-conductive and offset from a support that may be conductive so that no short circuit occurs when the cable insulation burns off. Accordingly the invention provides a flat cable deflection device with circuit integrity in case of fire including a cylindrical cable deflection element made from fire resistant insulating material and a support for the cylindrical cable deflection element made from fire resistant material. The support is offset from the cable deflection element, so that it facilitates enveloping the cylindrical deflection element with the flat cable without contacting the cylindrical deflection element.

Embodiments of an electrical installation using at least one flat cable deflection element of this type are also described. The flat cable includes plural high power current strands extending parallel adjacent to one another in a plane. The flat cable runs over the deflection device and changes its direction at the deflection device. The teachings of the invention with respect to the electrical installation are not limited to horizontally extending flat cables but equally suited for cases in which the flat cable is placed at a slope, e.g. in a sloping tunnel. Thus, it is sufficient that the transversal cable direction in front and after the deflection device extends horizontally. The flat cable envelops the cylindrical cable deflection element at least partially.

For some configurations the flat cable only goes through an elevation change at the deflection device about the diameter of the cylindrical deflection element, but does not go through an inclination change. Thus, it extends with its longitudinal direction in front and behind the deflection device horizontally or with constant slope. The axis of the cylindrical cable deflection element is oriented transversal to the angle bisecting line of the longitudinal cable directions in front and after the deflection device. For a rectangular corner the angle bisecting line of the corner angle extends at an acute angle of 45° relative to the cable longitudinal direction in front of the deflection device. The axis of the cylindrical cable deflection element is then arranged accordingly at an obtuse angle of 135° relative to the longitudinal cable direction in front of the deflection device.

In embodiments in which the orientation of the cable plane does not change the cylindrical cable deflection element is enveloped by half, thus the envelopment angle of the flat cable on the cable deflection element is 180°. Theoretically also 1.5 to 2.5 time envelopments are possible having an envelopment angle of 720°, 900°, . . . .

Additionally, the flat cable deflection device according to the invention can also advantageously provide inclination changes for the flat cable, e.g. when a horizontal shall be run in an orthogonal manner upward or downward. Thus, for this configuration of an electrical installation the longitudinal cable direction changes relative to horizontal. The axis of the cylindrical cable deflection element is then oriented transversal to the longitudinal cable direction in front and behind the deflection device. The envelopment angle is then identical for this configuration with the deflection angle. It is 90° for the recited embodiment of a rectangular corner.

The flat cable deflection device includes a cylindrical cable deflection element made from fire resistant insulating material and a support for the cylindrical deflection element made from fire resistant material. The support is offset from the cylindrical deflection element so that it facilitates its envelopment through the flat cable without contacting the flat cable.

In some embodiments the cylindrical cable deflection element is prolate, this means the diameter of the cylindrical cable deflection element is smaller than its cylinder height.

The fire resistant insulating material of the cylindrical cable deflection element is e.g. glass or ceramics. Since the high power current strands of the flat cable do not contact the support even when the cable insulation is burned off the support can be made e.g. from metal.

As recited supra the cylindrical cable deflection element has to be arranged with its cylinder axis perpendicular to the angle bisecting line of the cable deflection angle. Depending on the deflection angle different assembly angles can be required. As a matter of principle it is feasible to respectively mount the deflection device on the surface so that the deflection element is arranged at the necessary angle. For some embodiments, however, the support is configured so that it facilitates attaching the cylindrical cable deflection element under various angles relative to the support. This facilitates the assembly of the deflection device since when mounting to the surface the eventually required set angle only has to be considered approximately and the fine adjustment of the angle of the cable deflection element has to be performed after the attachment of the deflection device. Thus it is also, possible to implement another deflection angle, than the one for which the attachment has been performed, after the attachment of the deflection device.

For some embodiments a slotted hole attachment of the cable deflection element at the support provides that the cable deflection element can be arranged at various angles relative to the support.

In order to protect the high power current strands enveloping the cable deflection element in case of a fire against objects falling down a cover is provided for some embodiments above the cylindrical cable deflection element.

General Description of Preferred Embodiments of the Installation Kit and the Installation, in Particular with Respect to a Flat Cable with Circuit Integrity As a matter of principle it is facilitated through the described configuration of the flat cable deflection device to obtain circuit integrity by using a conventional flat cable e.g. as described in DE 2 206 187 that is not configured in particular for circuit integrity. Besides the lack of imparting mechanical tensions through the deflection device recited supra, this is due to the particularly favorable properties of flat cables with respect to a lack of conductors crossing over one another and a lack of internal tensions.

Advantageously the installation kit and the implemented electrical installation, however, use a flat cable which is configured in particular for circuit integrity. This is a flat cable with plural high power current strands extending parallel to one another in a plane, wherein fire resistant insulating material is arranged between the high power current strands. An insulating sleeve envelops the high power current strands and the fire resistant insulating material. The insulating material prevents that the conductors of the high power current strands can contact one another, e.g. under a mechanical shock load. The high power current strands and the fire resistant insulating material are enveloped by a plastic insulating sleeve which forms a position defining bedding for high power current strands and the fire resistant insulating material in case there is no fire. The insulating sleeve in turn for many embodiments is enveloped by a plastic cable jacket which defines the outer contour of the flat cable which provides the cable with resistance against aggressive substances and which can be marked and lettered in color. For some embodiments the insulation sleeve also takes over the function of the outer cable jacket.

In order to provide circuit integrity cable a person skilled in the art would conventionally resort to produce the remaining strand insulations through which e.g. the strands of a conventional round cable lie on top of each other from fire resistant insulating material. For the flat cable however, the fire resistant insulating material preferably extends like a bar between the high power current strands from one high power current strand to another. The bars extend e.g. parallel to the cable plane and are disposed e.g. in the center plane of the flat cable in which the also the high power current strands extend. The fire retardant insulating material thus forms a spacer for the high power current strands configured as a bar, wherein the bar is also maintained when all non-fire retardant insulations have burned off. Thus, the fire resistant insulating material does not evenly envelop the high power current strands in all directions but mainly only extends in the direction in which an adjacent high power current strand is disposed. This is the direction in which a short circuit risk mainly exists when the high power current strand is moved.

In one embodiment the fire resistant insulating material is formed by at least one fire resistant insulating layer. A one phase flat cable generally includes two or three high power current strands. For a three phase flat cable these are generally four or five high power current strands (one strand per phase and one respective strand for ground and protective conductor wherein the latter can be combined). The insulation layer preferably extends over the entire surface between the outer high power current strands, thus covers three or five high power strands including two or four intermediary spaces. The fire resistant insulating layer thus at least partially envelops the high power current strands. An insulating layer extends offset between the high power current strands towards the center plane of the flat cable.

In some embodiments the cable is produced with two fire resistant insulating layers, wherein one of them is applied on one side of the flat cable and the other one is applied from its other side. The insulating layers can be provided with glue on surfaces oriented towards each other during production, so that they form a glue joint where they join, thus between the strands in the center plane of the flat cable defined by the strands. The two fire resistant insulating layers thus enclose the high power current strands together and thus form insulating fire resistant bars between them.

In one embodiment the recited fire resistant insulating layer includes a mica layer. For embodiments with one respective insulating layer on a top side and a bottom side two respective mica layers are provided. Mica is an aluminum oxide silicate that can be split easily and which is electrically insulating and fire resistant.

However a pure mica layer is relatively difficult to process. For some embodiments the fire resistant insulating layer includes a flexible support band, e.g. a glass cloth band. The mica layer can be glued to the flexible support band. The flexible support band is applied to the high power current strands together with the mica layer when producing the flat cable, e.g. ironed on. The two mica layers can thus be respectively arranged on the outside, in this case the two support bands are glued together in the center plane or they can respectively be disposed inside, in this case the two mica bands are glued together in the center plane or a mica layer can join a support band, in this case the mica layer and the support band are glued together in the center plane.

In a conventional flat cable the high power current strands are typically made from a conductor and a strand insulation made from non fire resistant plastic material enclosing the conductor insulation in a cross section like a ring. Based on this the person skilled in the art after being disclosed the teachings to configure a flat cable with a fire resistant insulating layer in order to provide circuit integrity would consider arranging the fire resistant insulating layer above the strand insulations. In some embodiments of the invention, however, the fire resistant insulating layer, e.g. both fire resistant insulating layers directly contact the conductors of the high power current strands. Put differently, the strand insulations made from plastic material are lacking in this embodiment. Rather there is only one or there are only two fire resistant insulating layers and outside of them there is a joint insulating jacket made from plastic material. It was found namely that non fire resistant insulating material between the strand conductors and the insulating layers could lead to gas formation during combustion which could damage the insulating layer lying on a strand insulation of this type. In order to exclude this for some embodiments the fire resistant insulating layer directly contacts the conductors of the high power currents strands, thus does not enclose a non fire resistant insulation.

For alternative embodiments the fire resistant insulating material does not have the shape of bars between the high power current strands, but is formed rather through two insulating rods or insulating strings extending between two high power current strands in longitudinal direction. Also for this alternative embodiment the fire resistant insulating material between the high power strands prevents that the high power current strands come in contact with one another e.g. for a mechanical loading of the cable and thus could provide a short circuit.

In some embodiments the material of the insulation rods or insulation strings includes glass and/or ceramic material.

In some embodiments the circuit integrity properties are further improved in that the insulation jacket is completely or partially made from a plastic material that is mixed with a mineral which crystallizes upon combustion thus forming a crust. The crust formation additionally stabilizes the flat cable in a mechanical respect in case of a fire thus further reducing the risk of a short circuit. The mineral material can be e.g. a one or plural porcelain base material like kaolin.

As an additional measure for reducing the risks of short circuits upon impact of fire in some embodiments the high power current strands are arranged at a distance from one another which is greater than the typical minimum distance. Typically, the distance of adjacent high power current conductors from conductor surface to conductor surface is at least two times, preferably at least 2.5 times and particularly preferably at least 3 times the diameter of the high power current strands. The relatively large distance initially helps introducing fire resistant insulating material between the strands so that for a burned off insulation jacket the strands e.g. do not come in contact even under a mechanical shock load.

A method for producing a cable as recited supra that maintains circuit integrity can include e.g. the following activities:
(i) The conductors of the high power current strands are run under tension in their positions to be subsequently taken in the flat cable, thus in parallel in a plane and offset from one another;
(ii) On both flat sides a respective layer of fire resistant insulating material is respectively pressed onto the conductor arrangement, e.g. ironed on. The layer is formed e.g. through a flexible fire resistant support band, thus e.g. a glass fiber cloth band with a mica layer glued thereon and is respectively provided with glue towards the conductors. The layer with fire resistant insulating material thus encloses the conductors and glues together between the conductors to form a common layer of fire resistant insulating material;
(iii) The insulating jacket is extruded onto the layer made from fire resistant material.
(iv) Possibly an additional outer jacket is extruded onto the insulating jacket.

The activities are performed e.g. at various stations of an assembly line along which the flat cable to be produced moves continuously. For example at the beginning there are conductor drums from which the conductors are unwound. They can then run through an alignment device as a next station which brings them into said position. Subsequently the aligned conductors can run through a device for pressing or ironing on fire resistant insulating layers as a next station. The next station is formed by an extruder through whose jet the bundle of two fire retardant insulating layers with conductors disposed there between is run. This facilitates extruding the insulating layer onto the conductors. Subsequently there is a passage through an additional extruder for the outer jacket configured as another station. The last station is formed by a cable drum onto which the finished cable is wound.

General Description of Preferred Embodiments of the Installation Kit and the Electrical Installation, in Particular Regarding a Connection Device with Circuit Integrity Additional configurations relate to an installation kit and an implemented electrical installation with circuit integrity in case of a fire, wherein the additional installation furthermore includes at least one connection device for tapping into the continuous, thus not disassembled, flat cable without stripping the insulation, wherein the connection device provides circuit integrity in case of a fire. The connection device reaches about the flat cable and includes contact screws that can be screwed into the flat cable, wherein a respective pair of contact screws is provided for the high power current strands. The two contact screws of a pair are arranged so that when the flat cable is connected one contact screw contacts one side of the conductor of the high power current strand and the other contact screw contacts the other side of the high power current strand. The contact screws have a thread so that the conductor is laterally clamped by the two contact screws with the threads.

For conventional connection devices, e.g. configured according to DE 2 206 187 the contacting of the high power current strand is respectively performed through a contact screw provided with a tip, wherein the contact screw is arranged above the respective strand and initially penetrates the strand insulation with its tip while being screwed in and then centrally penetrates the conductor of the strand, thus contacting it. In case of a fire, however, in a conventional connecting device of this type maintaining the electrical contact between the contact screw and the strand conductor is not assured since when burning off the cable insulation the strand conductor pressed down by the contact screw tip is lacking the support otherwise provided by the cable insulation so that there is a risk that the contact screw and the strand conductor will disengage.

However, in embodiments of the connection device of the invention described supra a cohesion of contact screw and strand conductor is also provided when the entire cable insulation has burned off. This is respectively achieved in that a respective pair of contact screws is provided for a high power current strand. The two contact screws of a pair are thus arranged so that one contact screw contacts one side of the strand conductor and the other contact screw contacts the other side of the strand conductor so that they clamp the strand conductor between one another. Additionally the contact screws are provided with a tread where they contact the strand conductor differently than e.g. for DE 2 206 187 in which the contact screws have a smooth surface so that they clamp the strand conductor from both sides with their threads. When being screwed in, the thread edges of the contact screws laterally cut into the strand conductor, thus forming a type of counter thread in the strand conductor in which the contact screw engages with its thread in a form locking manner. As usual for screw threads the pitch of the thread is selected small enough so that self hemming is provided, thus e.g. force loading in axial direction cannot cause any rotation of the contact screw. Clamping the strand conductor according to embodiments of the present invention between the two contact screws and the self hemming thread engagement between contact screws and strand conductor provide circuit integrity, this means connection of contact screws and strand conductor when the cable insulation cannot provide any counter forces anymore due to burn off.

For some embodiments of the present invention the two contact screws of a pair are arranged at the same level of the pass through strand conductor, thus on a straight line perpendicular to the strand conductor. For other configurations, however, they are arranged offset relative to one another in longitudinal cable direction. In an offset arrangement the two contact screws press the strand conductor laterally in opposite directions so that it extends in a slight S-curve about the contact screws. Thus, the strand conductor envelopes the contact screws over a portion of their circumference which yields a large contact surface. This increases the probability of maintaining a contact in case of a fire, e.g. when any mechanical tension in the strand conductor is lost or when the cable suffers jolts through objects falling down.

In some embodiments the tread for lateral contacting the high power current strand is also simultaneously the screw thread which is used for screwing in the contact screw during installation. Thus, the thread extends from the end portion of the contact screws where it contacts the strand conductor to its shaft portion disposed more proximal to the screw head. In other embodiments the thread for lateral contacting the high power current thread is a thread that differs from any screw thread. For example the diameter of the thread used for contacting and disposed in the end portion can be smaller than the diameter of the thread disposed in the shaft portion and used for screwing in. In some embodiments the slope of the thread used for contacting is greater than the slope of the thread used for screwing in the screw. The latter measure has the effect during screwing in the contact screws that the strand conductor is pulled upward, this means in the direction of the screw head through the engagement of the thread used for contacting. Thus, the strand conductor is pulled in deeper between the two contact screws which has an additional favorable effect on circuit integrity.

In some embodiments a threaded block made from metal is used as a socket for the two contact screws, wherein the threaded block made from metal is arranged from the flat side of the cable above the respective strand it be contacted. In order to receive the two contact screws of the pair in a thread it is provided with respective counter threads. The threaded metal block is not only used as a mechanical socket for the contact screws, but it is also in electrical contact with the contact screws and thus the strand conductor through the thread contact. Also when all insulations burn off in case of a fire the metal threaded block keeps the two contact screws in their position where they clamp the strand conductor and thus stays in electrical contact with the strand conductor.

As a matter of principle there are plural options to prevent that a threaded block generates a short circuit through contact with an adjacent strand in case of a fire. For example in some embodiments fire resistant spacers between the stands and the threaded blocks are provided for this purpose. In some embodiments already the spatial arrangement of the threaded blocks excludes the risk of contacting the adjacent conductor or reduces it far enough so that a fire resistant spacer of this type between strands and threaded blocks can be omitted. Thus, in some embodiments the threaded blocks are only arranged above their respective high power current strand. Put differently, a threaded block extends transversally to the longitudinal cable direction so far that it does not overlap with the conductor of an adjacent strand. Additionally in some embodiments the threaded blocks are arranged offset from one another in order to increase their relative distances in longitudinal cable direction.

In some embodiments a socket is provided for the threaded blocks wherein the socket is made from fire resistant insulating material like glass or ceramic. It functions at the sides of the threaded blocks and at the top side of the threaded blocks facing away from the flat cable as an insulating spacer. Even when all plastic insulations burn off, the threaded blocks are fixated in their relative positions. Based on the double screw connection between the threaded blocks and the strands also the strands are fixated in their relative positions. The lateral spacing and also the upward spacing furthermore prevent a conductive contact with housing components or with a metal cage described infra in more detail. As already recited supra, no fire resistant insulating spacer hast to be provided towards the cable since the threaded blocks are conductively connected with the respectively associated strand conductor through contact screws anyhow so that a burn off of the cable insulation disposed there between does not pose any risk for circuit integrity.

In some embodiments the insulating fire resistant socket is integrally provided in one piece and includes cavities for receiving the threaded blocks. In principle the socket can also be provided in plural pieces, wherein the socket would then be assembled from plural pieces during mounting. The integral configuration thus facilitates a quicker and simpler assembly since then e.g. only the threaded blocks have to be inserted into the socket. The cavities are recesses for one respective threaded block. The cavities are e.g. open in downward direction, this means toward the cable and thus facilitate inserting a threaded block from the bottom side of the socket before the socket is placed onto the cable with the threaded blocks inserted therein. Towards the top side the socket can have one or plural openings in the cavities in order to facilitate screwing in the contact screws with the socket placed on the cable. "Integral" does not mean that the socket has to be made from one piece. It can rather also be made from plural pieces which are permanently connected with one another, e.g. glued together. The feature of being integral in one piece does not have to be maintained in case of a fire. E.g. when glue burns off in a fire the integral configuration of the socket will typically be lost. This, however, is not significant for circuit integrity when the integral configuration is primarily used for facilitating the assembly process, the socket, however, is kept together in assembled condition of the connection device e.g. by a fire proof housing or cage. In some embodiments the socket is integrally made form one piece e.g. milled form a glass cube or cast as a particular glass or ceramic component.

In some embodiments a metal housing is provided which due to the pass through openings for the flat cable and a possibly provided opening e.g. for a screw driver for screwing in the contact screws is also designated as "metal cage". The metal cage reaches around the flat cable and forms a support for the threaded blocks. When screwing a contact screw into the insulation of the flat cable namely a reactive force can be generated which attempts to lift the threaded block including the contact screw off from the flat cable. Though it is conceivable in view of the strand conductors clamped on both sides through threads to omit a support which prevents lifting off the threaded block, however, it is preferable for the assembly that lifting off the threaded blocks is e.g. prevented through a configuration with the metal cage recited supra. Since the metal cage is fire resistant the connection of the components of the connection device is also maintained in case of a fire. This has favorable consequence for circuit integrity in case of a fire.

In some embodiments the flat cable, the threaded blocks and possibly the insulating fire resistant socket receiving the threaded blocks is inserted into the metal cage during assembly. For this there are plural embodiments. E.g. the metal cage can be configured with a closeable cover that can be opened. The cover can e.g. be linked to the remaining metal cage at hinges, e.g. through screws. Alternatively a cage which is not configured with a cover can be open also e.g. at the top side besides being open at the face. At the upper opening an inward extending edge flange is configured. Through the upper opening it is feasible to insert the flat cable into the metal cage. The insulating fire retardant socket with the threaded blocks can e.g. be inserted from one face side under the edge flange. Eventually the entire assembly can e.g. be clamped through a wedge which is inserted between the insulating fire retardant socket and the edge flange.

The description of the function of the metal cage provided supra as a support for the metal blocks does not have to be interpreted so that the metal blocks would have to be directly supported at the metal cage. In some embodiments the insulating fire resistant socket is arranged there between and thus prevents a contact of metal cage and threaded blocks. In these embodiments the metal cage forms the support for the threaded blocks with the insulating socket connected there between.

In some embodiments a spacer plate made from fire resistant insulating material like glass or ceramics is provided at the bottom side of the flat cable, this means at the side of the flat cable facing away from the metal blocks with the contact screws. The spacer plate is used e.g. when assembling the connection device between flat cable and metal cage. Alternatively also an attachment of the spacer plate at the metal cage can also be provided e.g. through glue connections. Also a coating of the inner surface of the metal cage relative to the flat cable with fire resistant insulating material forms a "spacer plate" in this sense. When the insulation of the flat cable burns off the spacer plate prevents that the strand conductors and/or the contact screws extending downward beyond the strand conductors can come in contact with the metal cage.

Overall the configuration of the connection device in the two embodiments recited supra can generally also be characterized in that the connection device on the one hand side is configured from metal components which keep their mechanical and electrical functions under the effect of fire and on the other hand side the connection device is configured from one or plural spacer elements made from fire resistant material like glass or ceramics, so that even in case all insulations of the flat cable burn off or melt off an electrical short circuit between the various high power current strands is excluded.

In some embodiments furthermore a respective connection clamp is arranged at the threaded blocks, e.g. configured in the form of a threaded clamp for a branch off strand. In some of the embodiments the connection clamp is e.g. arranged proximal to the flat cable plane so that the branch off strands of the plural threaded blocks are supported in paths which are machined into the insulating fire resistant socket at its bottom side, this means at the side oriented towards the flat cable. The screw for tightening the screw clamp, however, can be accessible from the top side of the insulating fire resistant socket. In some embodiments an over voltage protection, this means a safety, is provided at the branch off so that the branch conductor is separated from the conductor formed by the flat cable in case of a short circuit so that the conductor formed by the flat cable maintains circuit integrity.

In view of a possible installation in a humid environment, e.g. in tunnels, and the loading with fire extinguishing water embodiments are advantageous in which the penetration of water into the contact portion is prevented or at least made more difficult. The locations have to be protected where the contact screws reach through the insulation of the flat cable. For this purpose in some embodiments a seal e.g. made form silicone rubber is provided between the flat cable and the insulating fire resistant socket with the threaded blocks. This seal is applied to the flat cable during the installation process after inserting the flat cable into the metal cage before the insulating fire resistant socket depending on the type of metal cage is applied or inserted. The seal prevents in an installed condition of the connection device that water can penetrate between the flat cable and the insulating fire resistant socket with the threaded blocks to the locations where the contact screws have perforated the insulation of the flat cable.

In order to increase the sealing effect in some embodiments the socket can be loaded with a force through the metal cage and can thus impart pressure onto the seal so that the seal is being compressed. For embodiments in which the metal cage is configured with a cover the force loading can be performed e.g. through the cover pressing onto the socket in that the cover is being clamped into its closed position with closing screws. In embodiments with a coverless cage rim flange that is open on top the force loading is performed e.g. through clamping with a wedge in that the wedge is inserted between the insulating fire resistant socket and the edge flange.

General Description of Embodiments of a Flat Cable Guide

Another aspect eventually relates to a flat cable guide with circuit integrity in case of a fire, wherein the flat cable guide includes at least one support for a flat cable and a receiver made from fire resistant insulating material like glass or ceramic. The receiver is arranged on the support and configured so that the flat cable with horizontally oriented transversal orientation can be inserted into the receiver.

The receiver has e.g. edges that are pulled up so that the flat cable cannot fall out. In some embodiments the receiver tightens up towards the upper opening in order to provide better protection against the cable falling out.

Based on the particularly advantageous properties of flat cables recited supra with respect to the conductors not crossing over and an absence of inner tensions the flat cable strands after burn off of the cable insulation will be disposed offset from one another in the insulating fire resistant receiver. As a matter of principle it is therefore possible to obtain circuit integrity using a conventional flat cable that is not configured in particular for circuit continuity, e.g. described according to DE AS 2 206 187.

The flat cable guide is advantageously used in installation kits and the implemented electrical installations use a flat cable as described supra that is configured in particular for circuit security, thus a flat cable in which a fire resistant insulating material is arranged between the high power current strands. This insulating material prevents that the conductors of the high power current strands can contact one another e.g. under mechanical shock loading.

BRIEF DESCRIPTION OF THE DRAWINGS

Preferred embodiments are now described with reference to drawing figures, wherein:

FIG. 3 illustrates a cross sectional view of a flat cable connection device with circuit integrity in case of a fire;

FIG. 4 illustrates a lateral view with two different embodiments of contact screws;

FIG. 5 illustrates a top view of a detail of the flat cable connection device illustrated in a sectional view in FIG. 3;

FIG. 6 illustrates a perspective view of an embodiment of an integral one piece threaded block socket.

FIG. 7 illustrates a perspective view of the inner components of the embodiment of FIG. 6 with a view of the integral one piece threaded block socket at a slant angle from below;

FIGS. 10a and b illustrate schematic depictions of the deflection and envelopment angle for the cable deflection according to FIG. 9, wherein

DETAILED DESCRIPTION OF EMBODIMENTS

The terms "longitudinal cable direction" and "transversal cable direction" are illustrated in the FIGURES through direction arrows "L" or "Q".

Figure 1:
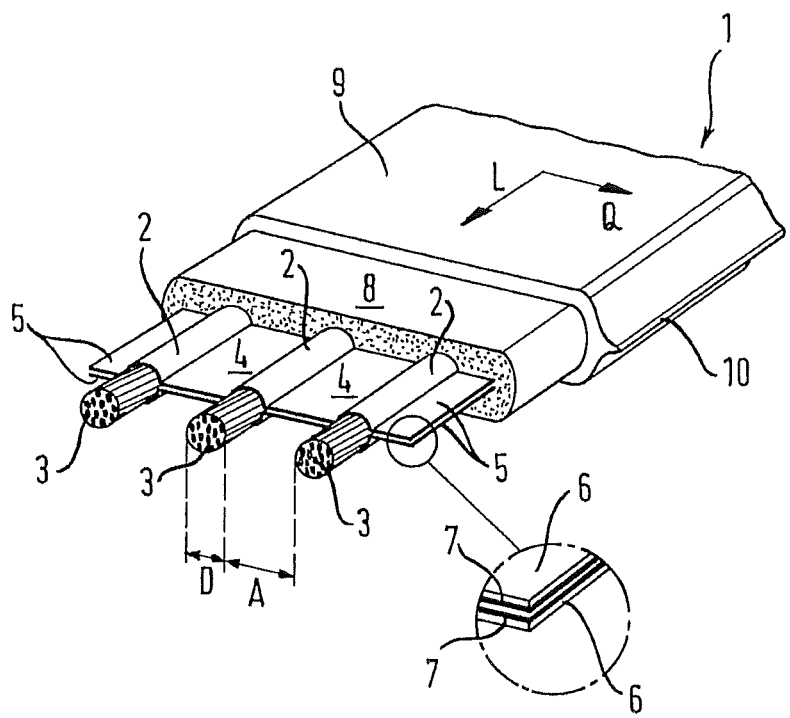
FIG. 1 illustrates a perspective view of a flat cable that is cut up in steps with circuit integrity in case of a fire according to a first embodiment with fire resistant insulating material that is arranged in a bar between the stands.

The flat cable illustrated in an exemplary manner in FIG. 1 is designated for single phase AC power and accordingly includes three high power current strands 2 (phase conductor, ground conductor and protective conductor). Each of the high power strands 2 is formed by a strand conductor 3 which is directly encased by a fire resistant insulating layer, this means without the strand insulation, that is annular in cross section as will be described infra in more detail. The strand conductors 3 extend parallel adjacent to one another in one plane and thus the center plane of the flat cable 1. The distance A between two strand conductors 3 is two times the diameter D of the strand conductors 3 in FIG. 1. In other embodiments the ratio ND is greater than e.g. 2.5 and 3.

In the center plane between the strand conductors 3 fire resistant insulating material 4 is arranged in a bar. It is formed through two fire resistant insulating layers 5, wherein one of them encloses the lower half of the strand conductor 3 that is disposed in FIG. 1 and the other one respectively encloses the upper half of the strand conductors 3 in a semi circular cross section. The fire resistant insulating layers 5 thus directly contact the metal surface of the strand conductors 3 as already recited supra without a combustible strand insulation arranged there between. Between the strand conductors 3 the fire resistant insulating layers 5 are glued together in the center plane of the flat cable 1. The two insulating layers 5 thus form fire resistant bars between the strand conductors 3 which keep the strand conductors at a distance also under complete combustion of the cable insulation as described infra, thus reducing the risk of a short. The complete encasement of the strand conductors 3 through the two fire resistant insulating layers 5 is also maintained in case of a fire and is thus used for preventing a short in case a contact with an exterior conduction capable component or in spite of the recited bars a contact of two strand conductors 3 should occur.

The fire resistant insulating layers 5 are respectively made from a fire resistant support band 6, thus a glass cloth band and a mica layer 7 glued there to. In the embodiment illustrated in FIG. 1 the two fire resistant insulating layers 5 are oriented so that both mica layers 7 are oriented towards the core of the cable, thus contact the strand conductors 3 and are glued together between the strand conductors in the center plane. The support bands 6 are thus oriented outward.

The packet formed by the strand conductors 3 and the fire resistant insulating layers 5 is completely embedded in an insulating layer 8 which provides mechanical stability to the cable channel 1 when there is no fire. The insulating jacket 5 is essentially made from a combustible plastic material mixed with minerals (e.g. kaolin) which caramelize in case of a fire. Thus the insulating layer 8 forms a crust in case of a fire, wherein the crust provides a particular additional mechanical stability and additional protection against short circuit contacts to the packet formed from the strand conductors 3 and the fire resistant insulating layers 5.

Figure 2:
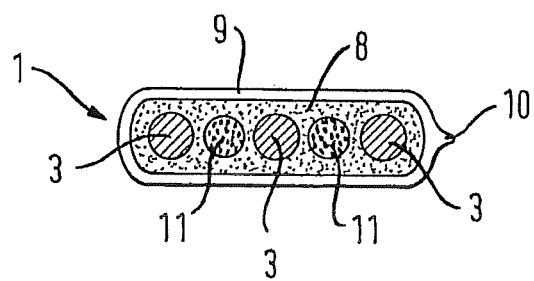
FIG. 2 illustrates a sectional view of a flat cable according to a second embodiment with strings made from fire resistant material extending in longitudinal direction between the strands.

The insulating layer 8 in turn is enveloped by a cable jacket 9 on its outside, wherein the cable jacket defines the outer contour of the flat cable 1. The cable jacket is made from combustible plastic material and thus burns off in case of a fire. In case there is no fire the cable jacket, however, defines the outer contour of the flat cable 1. Thus, the cable jacket is configured with an index lug 10 at one of the narrow sides of the flat cable 1, wherein the index lug removes the 180° symmetry of the flat cable 1 with respect to rotation about the longitudinal axis L which is otherwise provided. This can assure that the flat cable 1 can only be inserted with the correct orientation into a complementary connection device, but not with the bottom side up. The cable jacket 9 may be manufactured from a particular plastic material which provides resistance against aggressive substances to the flat cable 1. The cable jacket 9 is also a support for color markings, lettering etc. FIG. 2 illustrates another embodiment in which instead of the bar shaped insulating material longitudinally extending strings 11 from fire resistant insulating material, thus e.g. made from glass fibers, are arranged between the strand conductors 3. In the illustrated embodiment the strand conductors 3 and the strings 11 are directly embedded into the insulating jacket. In other embodiments, however, they are jointly encased by a fire resistant insulating layer on which the insulating jacket is applied first. With respect to the other properties of FIG. 2, e.g. with respect to the material with the insulating jacket 8 reference is made to the descriptions regarding FIG. 1 provided supra which also apply to FIG. 2.

Embodiments of a connection device with circuit integrity in case of a fire are now described in more detail with reference to FIGS. 3-8.

The connection device 12 is configured e.g. to connect a branch conductor to a pass through flat cable 1 without having to strip the insulation of the flat cable 1 or disassemble the flat cable 1. It is rather a tap contacting in which the connection device 12 can be applied at any location of the flat cable 1 and the electrical contact to the strand conductors 3 is provided through penetrating the cable insulation (insulation sleeve 8 and cable jacket 9) and possibly of the fire resistant insulating layer 5 through contact elements. The contact elements are a pair of contact screws 13a, 13b for each high power current strand 2. The contact screws 13a, 13b are arranged in one threaded block 14 over one side or another side of the associated strand conductor 3 and contact the one side or the other side of the strand conductor 3 installed (screwed in) condition. Thus, they clamp the strand conductor 3 from both sides with their thread 15. FIG. 3 completely illustrates one of the contact screws 13a in a completely screwed in condition, wherein the other contact screw is illustrated in only partially screwed in condition.

FIG. 4 illustrates two different embodiments of contact screws. In the first embodiment 13' the thread 15 extends essentially over the entire length of the screw shaft. In the threaded block 14 there is a respective counter thread for each contact screw 13'. The thread 13' in this embodiment is not only used for better contacting the strand conductor 3, but also for screwing in the contact screw 13' into the flat cable 1.

In the other embodiment 13" the thread 15 used for contacting the flat cable 1 is only disposed proximal to the screw head. A second thread 15' which is different there from is arranged proximal to the screw head, engages the counter thread in the threaded block 14 and is thus used for turning the contact screw 13" into the flat cable 1. In the second embodiment illustrated in FIG. 4 the contact establishing thread 15 has a smaller diameter and a larger pitch than the thread 15' used for screwing in.

As evident from FIGS. 5 and 7 the two contact screws 13a, b of a pair are arranged offset with respect to the longitudinal cable direction L in the threaded block 14. This causes a slightly S shaped envelopment of the contact screws 13a, b through the strand conductor 3 which is characterized as 16 in FIG. 5.

The threaded blocks 15 furthermore respectively include one connection clamp 17, thus configured as a screw clamp. The screw clamp is used for connecting a branch conductor which is run out of the connection device 12 as described infra in more detail. Since the threaded blocks 14 are made from a conductive fire resistant material, this means a metal like e.g. brass, they establish an electrically conductive connection from the respectively associated strand conductor 3 over the two contact screws 13a, b and the connection clamp 17 to the branch strand which is maintained when all insulation materials burn off, thus provides functional integrity in case there is a fire.

As illustrated in FIG. 5 the threaded blocks extend in a transversal direction Q of the cable only in a surrounding portion beyond the associated strand conductor 3, but not up to an adjacent strand conductor 3. Thus, there is no overlap with the strand conductor 3 of an adjacent strand 2. Additionally the threaded blocks 14 are also arranged offset in the longitudinal direction L which facilitates greater distances between the threaded blocks 14 over an arrangement that is not offset in longitudinal direction and also possible.

In order to keep the threaded blocks 14 at a distance from one another and also at a distance relative to a metal housing that is described infra in more detail and additionally to press on the flat cable 1, a socket 18 made from fire resistant insulating material, thus from glass is provided. In the embodiment of FIG. 5 this socket is made from particular glass blocks 19, wherein only those glass blocks 19 are illustrated in FIG. 5 which are associated with the center threaded block 14, while the socket 18 is integrally provided in one piece for the embodiment of FIGS. 6 and 7, e.g. milled from one glass block. The cross-sectional illustration of FIG. 3 illustrates both embodiments since they do not differ in the sectional axis which is designated "III" in FIGS. 5 and 6.

As evident from FIG. 3, the socket 18 laterally encloses the threaded blocks 14 and extends in a direction leading away from the cable in a perpendicular manner, this means the outward direction in FIG. 3, over the threaded blocks 14 including the screw heads. It reaches around the threaded blocks 14 to the upper edge with flanges 20 which have the function to press the threaded blocks 14 onto the flat cable 1 when a force is imparted onto the socket 18. Thus, they form a hold down flange for the socket 18. The socket 18 leaves an opening above each threaded block 14, wherein the opening leaves an access to the screw heads of the contact screws 13a, 13b and the contact clamp 17 in order to facilitate threading in the screws.

In an embodiment with a one piece integral socket 18, cavities 21 for receiving the threaded blocks 14 are provided at a side of the socket oriented towards the flat cable 1, wherein the inner contour is configured essentially complementary to the outer contour of the threaded blocks 14 (cf. FIG. 7). The socket 18 and the threaded blocks 14 terminate flush towards the flat cable 1, this means they are arranged in a common plane.

The connection device 12 is configured internally like a sandwich from plural layers in assembled condition. This layer structure is illustrated in the exploded illustration of FIG. 7. At the side of the flat cable 1 oriented away from the contact screws 13a, 13b (this means the bottom of FIG. 7) a spacer plate 22 is initially provided which is made from fire resistant insulating material, thus glass. The spacer plate 22 includes an index bevel 23 at one of its longitudinal sides which is shaped in a complementary manner to the index bevel 10 at the flat cable 1 and only facilitates inserting and contacting the flat cable 1 in an orientation with the index lug 10 against the index bevel 23, but not in the orientation that is rotated by 180°. The flat cable 1 is placed on the spacer plate 22. A flat gasket 24 is arranged in turn on the flat cable 1. The flat cable 1 has e.g. the shape of a rectangular thin plate with constant thickness. It is made from an elastic, non fire resistant material like e.g. silicon rubber. The socket 18 and the threaded blocks 14 in turn sit on the gasket 24, wherein the latter is inserted into the cavities 21 in the embodiment with a one piece integral socket 18.

The layer structure is kept together by a fire resistant housing, herein a metal cage 25. For the embodiment illustrated in FIG. 6 the metal cage is only closed on three sides. The metal cage is open at both faces. Also the top side of the metal cage 25 is open, however only up to the edge flanges 26 which are oriented inward from the longitudinally extending side walls 27 of the metal cage 25. The assembly of the connection device 12 is performed as follows for the embodiment according to FIG. 6: Initially the spacer plate 22 is placed onto the base of the metal cage 25 (for some embodiments it is already pre-assembled therein, e.g. glued). The flat cable 1 is arranged on the spacer plate 22, e.g. in that it is diagonally routed through the upper opening of the metal cage 25. The seal 24 is subsequently placed thereon. The socket 18 with already inserted threaded blocks 14 that are wired with the branch conductor are arranged on the seal 24. The latter is performed in that the socket 18 is slid in the longitudinal direction L through one of the open faces of the metal cage 25 under the edge flanges 26. Thus, the edge flanges 26 leave sufficient clearance in order to facilitate moving the socket 18 on the seal 24. In order to exclude movements of the layered configuration in assembled condition and in order to compress the gasket 24 eventually a respective wedge 28 is inserted in the cable longitudinal direction L between the top side of the socket 18 and the two edge flanges 26. In the embodiment of FIG. 6 the two wedges 28 are combined to form an integral U-shaped wedge element 29. The two free arms of the wedge element 29 form the wedges 28 that become thinner towards the free ends; the center connection arm, however, has no wedge function but is used for mechanically connecting the two wedges 28. The wedge angle of the wedges 28 is so small that self hemming is provided, thus the wedge 28, once inserted, cannot be pressed out again in cable longitudinal direction L through the reactive force of the compressed gasket 24. A closing plate 30 can be inserted under the edge flanges 26 within the wedges 28. This provides contact protection relative to the possibly voltage carrying heads of the contact screws 13a, 13b. The terminal plate 30 does not have to be made from fire resistant material, since in general in case of a fire no contact protection is required.

Figure 8:
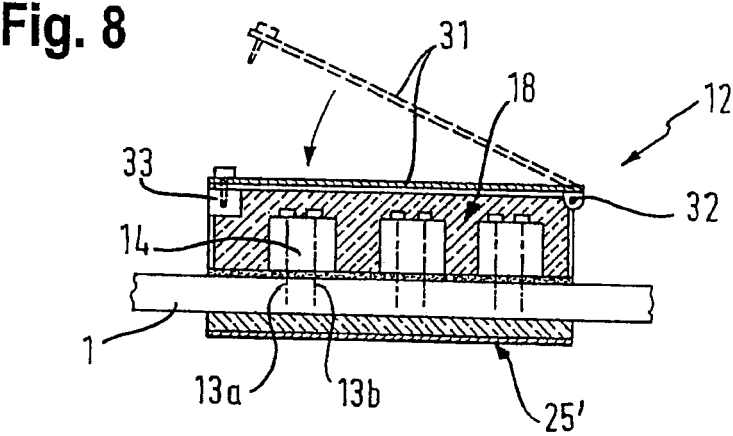
FIG. 8 illustrates a longitudinal sectional view of an embodiment of a connection device with a pivotable clamping cover.

Another embodiment of the metal cage is illustrated in FIG. 8, designated therein as 25'. Instead of the edge flanges an opening capable cover 31 is provided therein which is linked at one of the faces of the metal cage 25' through a hinge 32. The cover 31 can be closed through a threaded closure 33 and can be blocked in the closed position. The cover 31 thus presses onto the top side of the socket 18 so that the socket 18 presses onto the gasket 24 when the threaded closure 33 is loaded, thus compressing the gasket 24.

Details of the branch conductor 34 are illustrated in FIG. 7. As recited supra the branch conductor 34 is e.g. a conventional fire protected round cable with twisted strands. Short circuits between the strands are prevented herein e.g. through special fire resistant strand insulations. The branch conductor 34 is fanned out within the contact device 12 into particular strands 35 designated as branch conductors. Thus, grooves 36 are fabricated into the side of the socket 18 oriented towards the flat cable 1. The grooves 36 extend above the strand conductors 3 respectively arranged below, so that a respective conductor contact would not be harmful. The strand conductors 35 are only joined in the end portion. Short circuits in this end portion are excluded through said fire resistant configuration of the strand insulations of the strand conductors 35. In some embodiments furthermore the bottom side of the socket 18 is entirely or partially covered by a fire resistant insulating plate. The branch conductor 34 is configured with a pull relief 37 at the socket 18. In some embodiments an excess current safety is additionally integrated in the socket 18 so that a short circuit in the branch conductor 34 does not lead to a loss of function of the entire conductor arrangement formed by the flat cable 1.

Embodiments of a flat cable deflection device 38 with circuit integrity in case of a fire are now described in more detail with reference to FIGS. 8 through 13. Thus, the FIGS. 9 and 10 schematically illustrate the path of the cable and the deflection and the envelopment angle for a deflection with directional change without inclination change.

Figure 9:
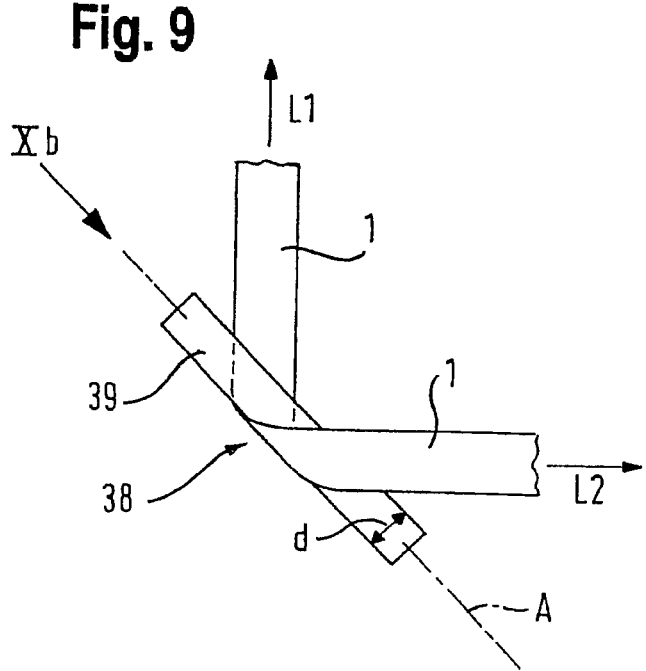
FIG. 9 illustrates a schematic top view of the orientation of a flat cable deflection device and of the cable routing for a cable deflection parallel to the flat cable plane.
Figure 10A:
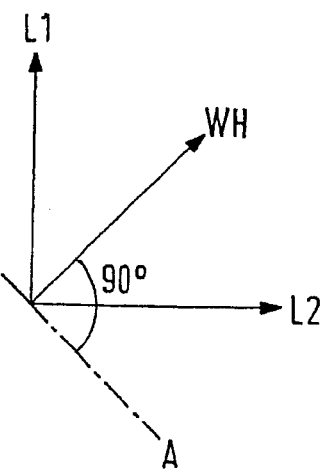
Figure 10B:
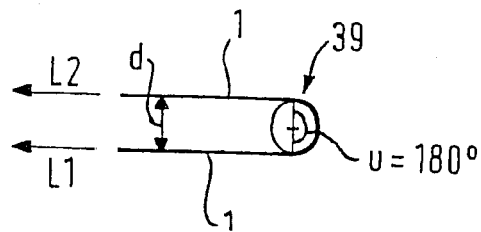
FIG. 10b illustrates the view of FIG. 9 from the direction Xb.

In the embodiment illustrated in FIGS. 9 and 10 the directional change of the flat cable 1 is 90°. The flat cable 1 impacts a cylindrical cable deflection element 38 at an angle which is half of the deflection angle, thus herein 45°, wherein the axis of the cable deflection element is designated as A. The axis A is arranged parallel to the plane defined by the flat cable 1. The flat cable 1 envelops the cylindrical cable deflection element 38 about half its circumference on its backside and leaves the cable deflection element in turn at an angle which corresponds to half the deflection angle, thus herein 45° relative to the axis A. As illustrated in FIG. 10a, the axis A is oriented perpendicular to the angle bisecting line WH between the two longitudinal cable directions L1, L2 in front and after the deflection. The transversal cable direction 2 extends horizontally in front and after the deflection device 38, so that the strand conductors 3 do not lie on top of one another when the cable insulation 8, 9 burns off. FIG. 10b illustrates that the inclination of the flat cable 1 is not affected by the deflection, this means the longitudinal cable directions L1 and L2 are both parallel to the plane defined by the flat cable 1 in front of or behind the deflection. For this deflection without inclination change the flat cable 1 envelops half the circumference of the cylindrical cable deflection element, thus the envelopment angle designated as "u" in FIG. 10b is 180°. Due to the deflection the flat cable 1 is subject to an elevation change which corresponds to the diameter d of the cylindrical cable deflection element 38.

Figure 11:
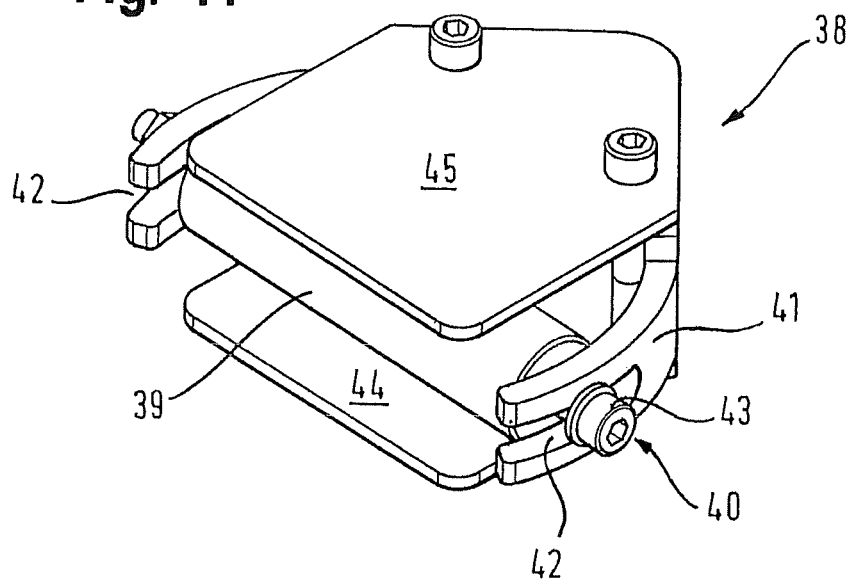
FIG. 11 illustrates a perspective view of a flat cable deflection device.
Figure 12:
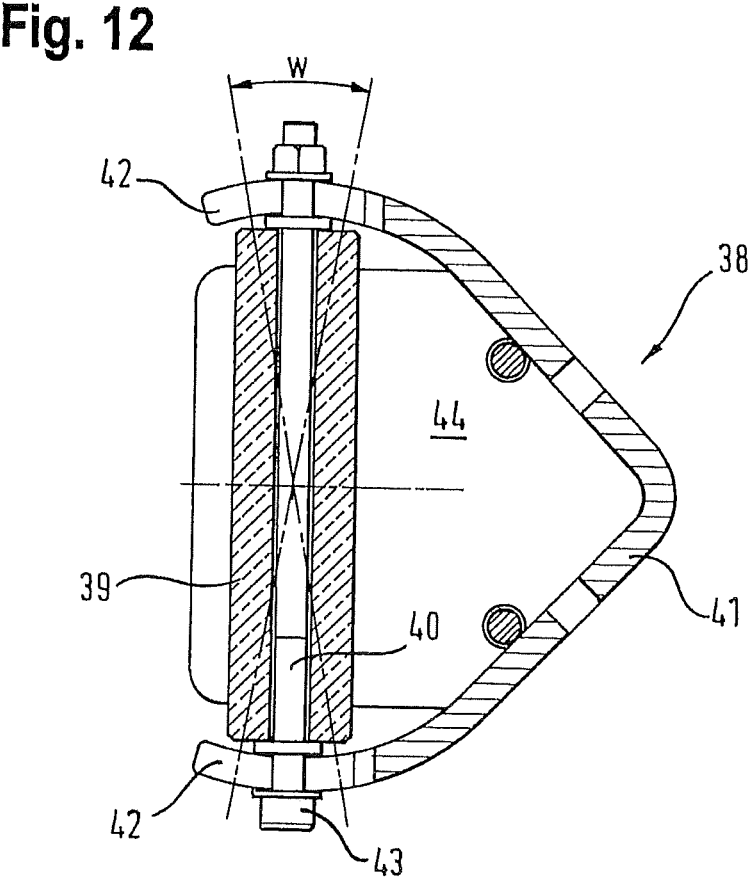
FIG. 12 illustrates a cross section of the flat cable deflection device of FIG. 11 through its center plane.

The FIGS. 11 and 12 illustrate the configuration of an embodiment of a flat cable deflection device 38. The cylindrical cable deflection element 39 is a cylinder made from fire resistant insulating material, thus glass which is located on a metal axle 40. Ends of the axle 40 protruding over the cable deflection element 39 are supported in a fork shaped support 41. The support 41 is offset from the cylindrical cable deflection element 39 so that it facilitates its envelopment through the flat cable 1 without cable contact. The support 41 is provided with slotted holes 42 at both fork ends which facilitate arranging the axis 40 with the cable deflection element 39 in various angular positions relative to the support 41 and fixating it through axis attachment screw 43. The angular range w of the possible setting angles is illustrated in FIG. 12. In the illustrated embodiment furthermore a base plate 44 and a cover plate 45 are provided which extend so that they overlap the deflection element 39. The base- and cover plate 44, 45 extend parallel to one another and respectively only leave a relatively narrow gap open towards the cable deflection element 49. Thus, the embodiment is suitable for the cable deflection with constant inclination of the flat cable described in combination with FIGS. 9 and 10 but not for the subsequently described variant of a deflection with inclination change for which the cover plate 45 has to be removed.

Figure 13A:
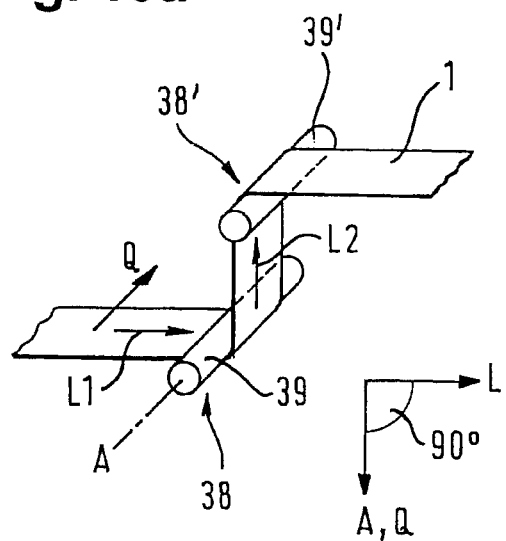
FIG. 13 a-c illustrates schematic depictions of the deflection and envelopment angle for a cable deflection out of the flat cable plane.
Figure 13B:
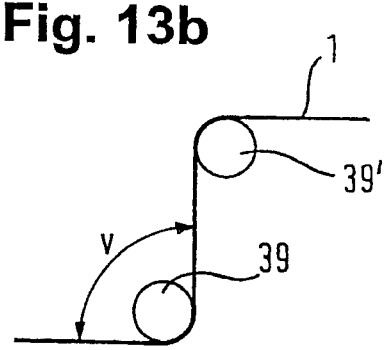
Figure 13C:
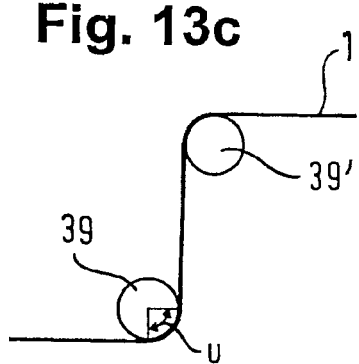

This other type of deflection with inclination change is illustrated in FIG. 13. It is a deflection in which the planes respectively defined by the flat cable 1 before and after the deflection are not parallel to one another. Regardless of this defect also here the cable transversal direction Q before and after the deflection device extends horizontally so that the strand conductors 3 do not lie on top of one another also when the cable insulation 8, 9 burns off. In the embodiment illustrated in FIG. 13 two deflection devices with one respective cable deflection element 39 are being used in order to implement an elevation offset of a horizontally extending flat cable 1 or a flat cable 1 extending at a slant angle. Initially the flat cable 1 is deflected about the first cable deflection element 39 by 90° from the original cable plane so that it is deflected is back by the same angle through the second cable deflection element 39'. In this embodiment the axis A of the cylindrical cable deflection element 39, 39' is parallel to the transversal cable direction Q and thus oriented at a right angle to the cable longitudinal direction L (FIG. 13a). The envelopment angle u (FIG. 13c) for this type of deflection is identical with the deflection angle v (FIG. 13b).

Figure 14:
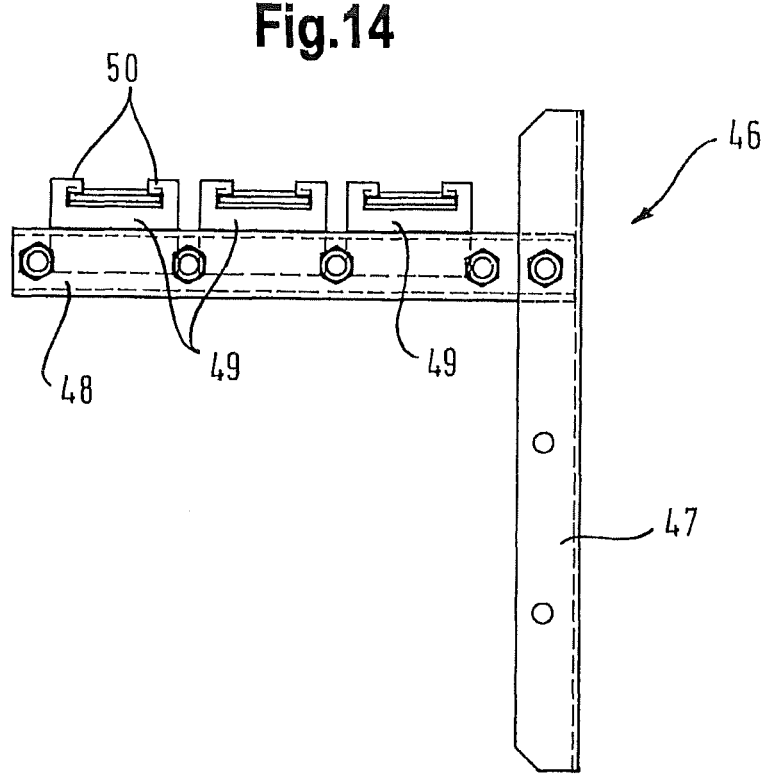
FIG. 14 illustrates a lateral view of a cable support.
Figure 15:
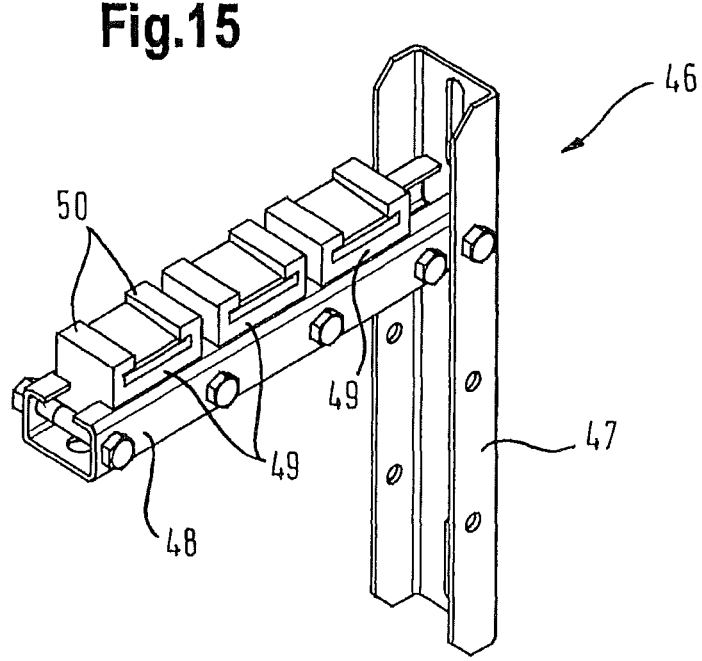
FIG. 15 illustrates a perspective view of the cable support of FIG. 14.

The FIGS. 14 and 15 illustrate an embodiment of a support 46 which can be part of a flat cable guide (e.g. along a tunnel wall). The support 46 has a mounting rail 47 which can be mounted to a wall, e.g. tunnel wall. The mounting rail 47 supports a support arm 48 on which one or plural flat cable receivers 49 are arranged. The mounting rail 47 and the support arm 48 are made from metal while the flat cable receivers 49 are made from fire resistant insulating material, herein glass. The flat cable receiver 49 has pulled up rims 50 which tighten towards the upper opening of the cable receiver 49, thus preventing the inserted flat cable 1 from falling out.

Figure 16:
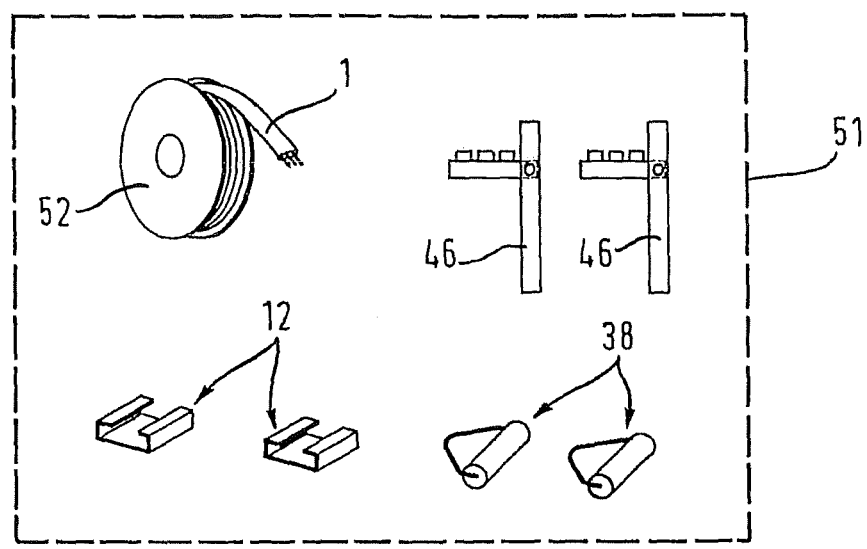
FIG. 16 illustrates a schematic depiction of an installation kit.

FIG. 16 schematically illustrates an embodiment of an installation set 51 for an electrical installation with circuit integrity in case of a fire. An installation kit of this type is an assortment of different components for putting together an installation that maintains circuit integrity in case of a fire, wherein the components are matched with respect to function, material selection and dimensions, so that they facilitate an adjustment of an installation of the recited type. A component kit of this type will e.g. be provided at a construction site before the actual installation work can begin.

The embodiment illustrated in FIG. 16 includes a cable drum 52 with a wound up flat cable 1 as it was described e.g. in the context with FIGS. 1 and 2. The embodiment furthermore includes plural connection devices 12, flat cable deflection devices 38 and support arms 48 as described supra in the context with FIGS. 3 through 14. The illustration is only exemplary. For example larger or smaller numbers can be provided of particular components or some components may be lacking completely.

Figure 17:
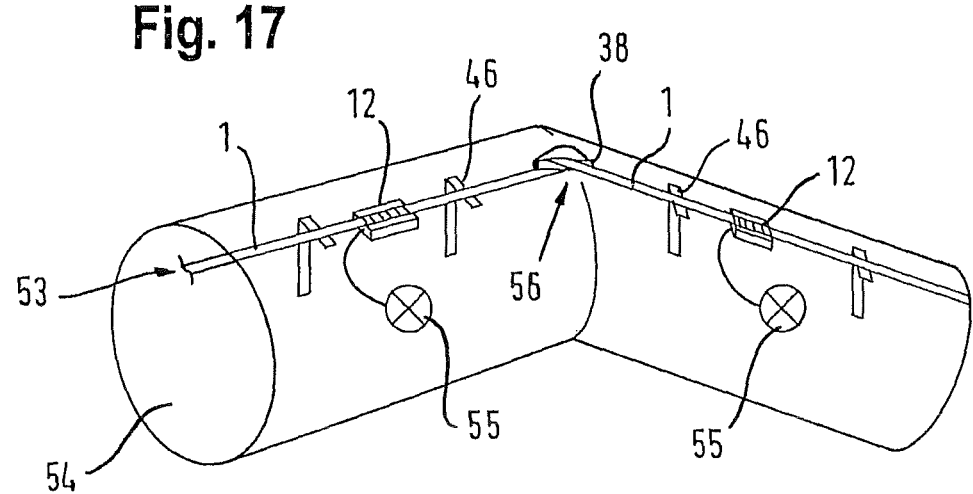
FIG. 17 illustrates a schematic depiction of an implemented electrical installation.

FIG. 17 eventually illustrates an implemented electrical installation 53 which is illustrated with reference to an embodiment of a tunnel 54. A flat cable 1 as described with reference to FIGS. 1 and 2 extends supported by the support arms 48 along the tunnel 54 under the tunnel ceiling. Connection devices 12 are provided in order to supply electrical consumers 55 through branch conductors 34 with functional integrity in case of a fire. A directional change of the tunnel 54 occurs at 55. Therein a flat cable deflection device 38 as recited supra is arranged at which the flat cable 1 is deflected without inclination change according to the directional change 56. The illustration of FIG. 17 in turn is only exemplary. The number of installation elements being used for an installation of this type can be greater or smaller than in FIG. 17. Particular elements can also be lacking in their entirety.

Overall the embodiments provide a novel installation system assuring circuit integrity and components thereof which can also be advantageously used by themselves, wherein the installation system is based on the particular inherent suitability of the flat cable for circuit integrity.

All publications and existing systems mentioned in this specification are herein incorporated by reference.

Although certain products constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

What is claimed is:

1. A flat cable deflection device with circuit integrity in case of a fire, comprising: a cylindrical cable deflection element made from fire resistant insulating material, wherein the cylindrical cable deflection element has a cylinder axis; and
   a support for the cylindrical cable deflection element made from fire resistant material, wherein the support is offset from the cylindrical cable deflection element so that the support facilitates enveloping the cylindrical cable deflection element with a flat cable without the support contacting the flat cable,
   wherein the support provides installation positions of the cable deflection element under various angles of the cylinder axis relative to the support,
   and further wherein the support supports both ends of the cylindrical cable deflection element like a fork.

2. The flat cable deflection device according to claim 1, wherein the cylindrical cable deflection element is prolate.

3. The flat cable deflection device according to claim 1, wherein the fire resistant insulating material of the cable deflection element is glass or ceramic and/or wherein the fire resistant material of the support is metal.

4. The flat cable deflection device according to claim 1, wherein a cover is provided above the cylindrical cable deflection element.

5. An electrical installation, comprising:
   at least one flat cable deflection device with circuit integrity in case of a fire, comprising:
     a cylindrical cable deflection element made from fire resistant insulating material, wherein the cylindrical cable deflection element has a cylinder axis; and
   a support for the cylindrical cable deflection element made from fire resistant material, wherein the support is offset from the cylindrical cable deflection element so that the support facilitates enveloping the cylindrical cable deflection element with a flat cable without the support contacting the flat cable:
   wherein the support provides installation positions of the cable deflection element under various angles of the cylinder axis relative to the support;
   the electrical installation further comprising:
   at least one flat cable comprising plural high power current strands extending parallel adjacent to one another in a plane, where the flat cable runs over the deflection device and changes its direction at the deflection device,
   wherein the transversal cable direction in front and after the deflection device extends horizontally, and
   wherein the flat cable envelops the cylindrical cable deflection element at least partially.

6. The electrical installation according to claim 5, wherein the flat cable with its longitudinal direction extends horizontally or with the same inclination relative to horizontal in front and after the deflection device and the axis of the cylindrical cable deflection element is oriented transversal to the angle bisecting line of the longitudinal cable directions.

7. The electrical installation according to claim 5, wherein the envelopment angle of the flat cable on the cylindrical cable deflection element is 180°.

8. The electrical installation according to claim 5 wherein the cable longitudinal direction changes at the deflection device relative to horizontal and the axis of the cylindrical cable deflection element is oriented transversally to the cable longitudinal direction in front and after the deflection device.

9. An installation kit or an electrical installation with circuit integrity in case of a fire comprising at least one flat cable deflection device with circuit integrity in case of a fire and a flat cable,
   the flat cable deflection device comprising:
     a cylindrical cable deflection element made from fire resistant insulating material, wherein the cylindrical cable deflection element has a cylinder axis; and
     a support for the cylindrical cable deflection element made from fire resistant material, wherein the support is offset from the cylindrical cable deflection element so that the support facilitates enveloping the cylindrical cable deflection element with a flat cable without the support contacting the flat cable,
   wherein the support provides installation positions of the cable deflection element under various angles of the cylinder axis relative to the support,
   the flat cable comprising plural high power current strands extending in one plane.

10. The installation kit according to claim 9 comprising at least one connection device for tapping into the flat cable without stripping an insulation of the flat cable.

11. A flat cable deflection device with circuit integrity in case of a fire, comprising: a cylindrical cable deflective element made from fire resistant material, wherein the cylindrical cable deflection element has a cylinder axis; and a support for the cylindrical cable deflection element made from fire resistant material, wherein the support is offset from the cylindrical cable deflection element so that the support facilitates enveloping the cylindrical cable deflection element with a flat cable without the support contacting the flat cable, wherein the support provides installation positions of the cable deflection element under various angles of the cylinder axis relative to the support, and further wherein the mounting of the cylindrical cable deflection element with the cylinder axis under various angles is facilitated through a slotted hole attachment.

12. The flat cable deflection device according to claim 11, wherein the cylindrical cable deflection element is prolate.

13. The flat cable deflection device according to claim 11, wherein the fire resistant material of the cable deflection element is glass or ceramic and/or wherein the fire resistant material of the support is metal.

14. The flat cable deflection device according to claim 11, wherein a cover is provided above the cylindrical cable deflection element.

\* \* \* \* \*